United States Patent
Harada

(10) Patent No.: US 9,982,719 B2
(45) Date of Patent: May 29, 2018

(54) WHEEL BEARING APPARATUS

(71) Applicant: JTEKT CORPORATION, Osaka-shi, Osaka (JP)

(72) Inventor: Eishou Harada, Yamatotakada (JP)

(73) Assignee: JTEKT CORPORATION, Osaka (JP)

( * ) Notice: Subject to any disclaimer, the term of this patent is extended or adjusted under 35 U.S.C. 154(b) by 0 days. days.

(21) Appl. No.: 15/592,593

(22) Filed: May 11, 2017

(65) Prior Publication Data

US 2017/0335890 A1  Nov. 23, 2017

(30) Foreign Application Priority Data

May 18, 2016 (JP) ................................ 2016-099666

(51) Int. Cl.
*F16C 33/78* (2006.01)
*F16C 33/80* (2006.01)
*F16C 19/18* (2006.01)

(52) U.S. Cl.
CPC ........ *F16C 33/7863* (2013.01); *F16C 33/782* (2013.01); *F16C 33/7826* (2013.01); *F16C 33/7866* (2013.01); *F16C 33/805* (2013.01); *F16C 19/186* (2013.01); *F16C 33/7823* (2013.01); *F16C 33/7876* (2013.01); *F16C 33/7886* (2013.01); *F16C 2326/02* (2013.01)

(58) Field of Classification Search
CPC .............. F16C 2326/02; F16C 33/7863; F16C 33/7866; F16C 33/782; F16C 33/7826; F16C 33/805; F16C 33/7823; F16C 33/7886; F16C 19/184–19/187; F16J 15/447; F16J 15/4476; F16J 15/3264
See application file for complete search history.

(56) References Cited

U.S. PATENT DOCUMENTS

| 4,372,628 | A | * | 2/1983 | Kiener | ................ B60B 27/0005 384/476 |
|---|---|---|---|---|---|
| 4,402,558 | A | * | 9/1983 | Olschewski | ........ B60B 27/0005 384/469 |
| 2003/0099419 | A1 | * | 5/2003 | Vignotto | ................ F16C 19/184 384/539 |
| 2003/0102711 | A1 | * | 6/2003 | Vignotto | ................. B60B 27/02 301/35.627 |

(Continued)

FOREIGN PATENT DOCUMENTS

| JP | 2014-052070 A | 3/2014 |
|---|---|---|
| JP | 2014-095403 A | 5/2014 |
| JP | 2014-240679 A | 12/2014 |

*Primary Examiner* — Alan B Waits
(74) *Attorney, Agent, or Firm* — Oliff PLC

(57) ABSTRACT

A wheel bearing apparatus includes a hub shaft having a flange to which a wheel is attached and which is located on a vehicular outer side, an outer ring, a plurality of rolling elements, an annular seal member, and an annular slinger. The slinger has a circular ring portion that is in contact with the flange and a tube portion extending from the circular ring portion toward a vehicular inner side. The tube portion has pawl portions located on the vehicular inner side to engage with a recessed portion of an outer periphery of the hub shaft to inhibit the slinger from being displaced toward the vehicular inner side. The tube portion is further provided with a plurality of slits that is formed along a circumferential direction and that is open on the vehicular inner side. The slits include slits with different depths.

8 Claims, 6 Drawing Sheets

(56) References Cited

U.S. PATENT DOCUMENTS

| | | | |
|---|---|---|---|
| 2010/0129018 A1* | 5/2010 | Shigeoka | B60B 27/0005 |
| | | | 384/544 |
| 2013/0127119 A1* | 5/2013 | Haepp | F16C 33/7863 |
| | | | 277/351 |
| 2015/0151573 A1* | 6/2015 | Shibayama | F16J 15/3264 |
| | | | 277/351 |
| 2015/0151574 A1* | 6/2015 | Barberis | F16C 33/783 |
| | | | 384/486 |
| 2016/0003302 A1* | 1/2016 | Seno | F16J 15/3264 |
| | | | 277/351 |
| 2016/0131257 A1* | 5/2016 | Sakai | F16J 15/002 |
| | | | 277/351 |
| 2016/0178010 A1* | 6/2016 | Kaiser | F16C 33/805 |
| | | | 277/351 |

* cited by examiner

WHEEL BEARING APPARATUS

INCORPORATION BY REFERENCE

The disclosure of Japanese Patent Application No. 2016-099666 filed on May 18, 2016 including the specification, drawings and abstract, is incorporated herein by reference in its entirety.

BACKGROUND OF THE INVENTION

1. Field of the Invention

The invention relates to a wheel bearing apparatus.

2. Description of the Related Art

Vehicles such as automobiles include wheel bearing apparatuses (hub units) to support wheels so as to make the wheels rotatable. A wheel bearing apparatus includes a hub shaft, an outer ring, a plurality of rolling elements (for example, a plurality of balls), and a cage. The hub shaft has a flange to which a wheel is attached and which is located on a vehicular outer side. The outer ring is provided radially outward of the hub shaft. The rolling elements are provided between the hub shaft and the outer ring. The cage holds the rolling elements. Such a wheel bearing apparatus includes a sealing apparatus installed in a bearing interior between the hub shaft and the outer ring where the rolling elements are provided, in order to prevent ingress of foreign matter such as muddy water from a bearing exterior (see, for example, Japanese Patent Application Publication No. 2014-95403 (JP 2014-95403 A)).

A conventional sealing apparatus includes a seal member attached to a part of the outer ring. A configuration has been proposed in which a lip of the seal member is in sliding contact with a part of the hub shaft. However, the hub shaft is formed of, for example, carbon steel for machine structural use. Thus, when muddy water adheres to the part of the hub shaft with which the lip is in sliding contact and the part gets rusted, the rust attacks the lip to promote wear of the lip. Eventually, foreign matters may enter the bearing interior.

Thus, as depicted in FIG. 6, measures are taken to prevent wear of a lip 94 of a seal member 93 by attaching an annular slinger 99 (formed of stainless steel) to a hub shaft 90, and bringing the lip 94 into sliding contact with the slinger 99.

The slinger 99 is only externally fitted and attached to a part (attachment portion 91) of the hub shaft 90. Thus, while the vehicle is traveling, the slinger 99 may eventually move toward a vehicular inner side (this phenomenon is referred to as walkout). When the slinger 99 moves toward the vehicular inner side (in other words, toward the seal member 93), an interference of the lip 94 of the seal member 93 increases, leading to an increase in frictional resistance and in rotational loss. This may also cause the lip 94 to be abnormally worn off or to generate heat, resulting in degradation of the lip 94.

Even when the walkout as described does not occur, external water or the like may enter the bearing interior through a possible clearance between the slinger 99 and a flange 92. As a result, the hub shaft 90 may get rusted. When water or the like infiltrates through the clearance and further reaches even the bearing interior, the rolling elements (balls) 96 or a raceway 97 may be damaged. Consequently, the life of the wheel bearing apparatus may be shortened.

SUMMARY OF THE INVENTION

An object of the invention is to provide a wheel bearing apparatus in which a slinger is kept from moving from a predetermined position on a hub shaft to prevent foreign matter such as water from entering the bearing interior through a clearance between the slinger and a flange.

A wheel bearing apparatus in an aspect of the invention includes a hub shaft having a flange to which a wheel is attached and which is located on a vehicular outer side, an outer ring provided radially outward of the hub shaft, a plurality of rolling elements provided between the hub shaft and the outer ring, a cage that holds the rolling elements, an annular seal member attached to the outer ring, and an annular slinger externally fitted and attached to the hub shaft and with which the seal member is in sliding contact. The slinger has a circular ring portion that is in contact with the flange and a tube portion extending from the circular ring portion toward a vehicular inner side. The tube portion has a pawl portion located on the vehicular inner side to engage with a part of an outer periphery of the hub shaft to inhibit the slinger from being displaced toward the vehicular inner side. The tube portion is further provided with a plurality of slits that is formed along a circumferential direction and that is open on the vehicular inner side. The slits include slits with different depths.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
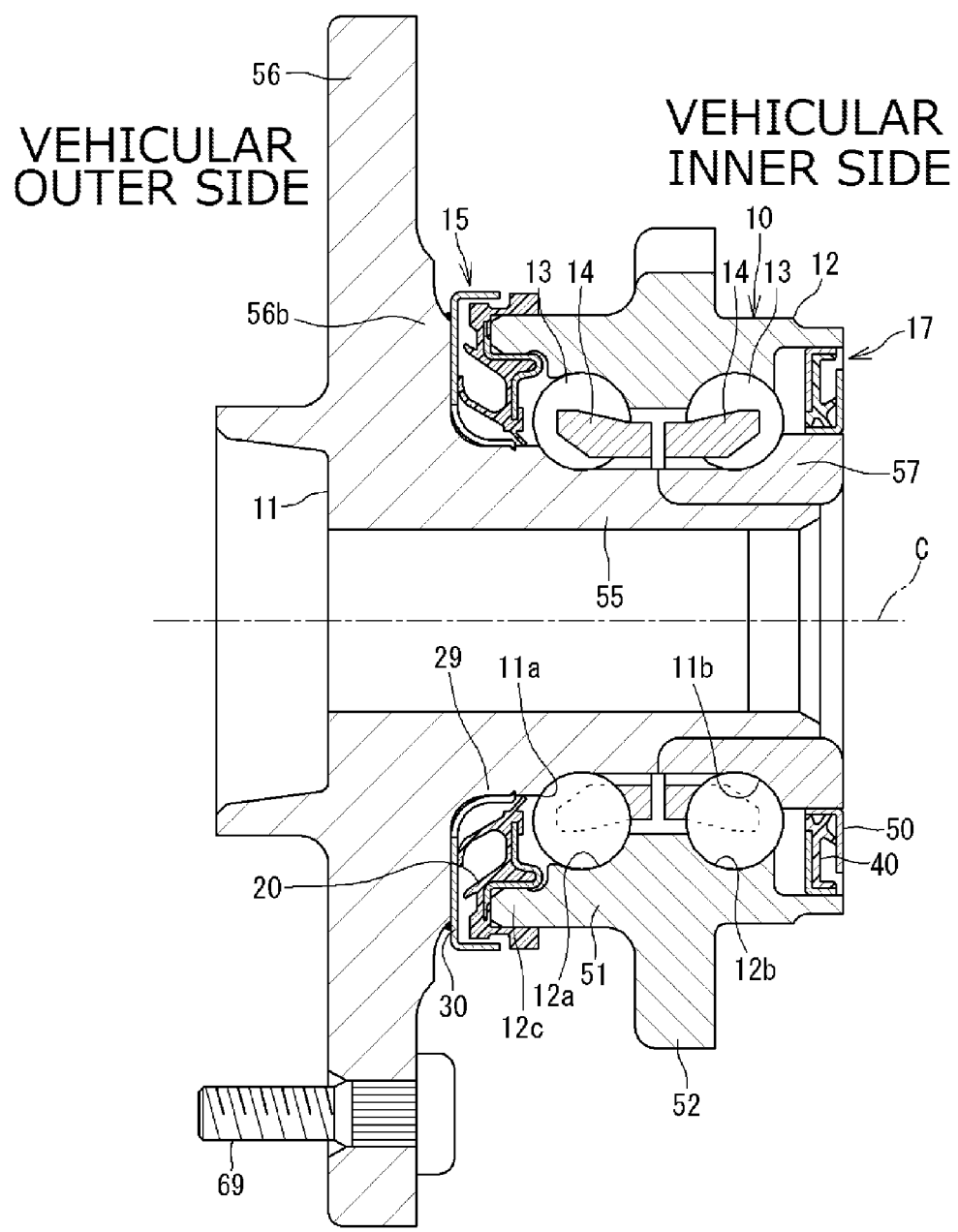
FIG. 1 is a sectional view of a wheel bearing apparatus.

An embodiment of the invention will be described below with reference to the drawings. FIG. 1 is a sectional view of a wheel bearing apparatus. Vehicular bearing apparatuses (hub units) 10 are each attached to, for example, a corresponding suspension system (knuckle) on a vehicle body side of an automobile to support a corresponding wheel so as to make the wheel rotatable. The wheel bearing apparatus 10 includes a hub shaft 11, an outer ring 12, rolling elements 13, cages 14, and sealing apparatuses 15, 17.

The outer ring 12 is a cylindrical member formed of, for example, carbon steel for machine structural use. The outer ring 12 has an outer ring main body 51 shaped like a cylinder and a flange portion 52 for fixation provided so as to extend radially outward from the outer ring main body 51. The flange portion 52 is fixed to the knuckle (not depicted in the drawings) that is a vehicle body-side member. Consequently, the wheel bearing apparatus 10 including the outer ring 12 is fixed to the knuckle.

With the wheel bearing apparatus 10 fixed to the vehicle body, a flange 56 for wheel attachment provided on the hub shaft 11 and described below is located on an outer side of the vehicle. In other words, a left side of FIG. 1 (flange 56 side) corresponds to a vehicular outer side. A right side of FIG. 1 corresponds to a vehicular inner side. A lateral direction in FIG. 1 corresponds to an axial direction of the wheel bearing apparatus 10.

On an inner peripheral surface of the outer ring 12, a vehicular outer-side outer ring raceway surface 12a and a vehicular inner-side outer ring raceway surface 12b are formed.

The hub shaft 11 has a shaft main body portion 55, a flange 56 for wheel attachment, and an inner ring member 57. These components are formed of, for example, carbon steel for machine structural use. The shaft main body portion 55 is a shaft member that is elongate in an axial direction. The flange 56 is provided so as to extend radially outward from the vehicular outer side of the shaft main body portion 55 and is shaped like a circular ring. The flange 56 has a plurality of holes formed along a circumferential direction. Bolts 69 for wheel attachment are attached into the respective holes. Besides the wheel not depicted in the drawings, a brake rotor is attached to the flange 56. The inner ring member 57 is an annular member fitted and attached to the vehicular inner side of the shaft main body portion 55. A shaft raceway surface 11a is formed on the vehicular outer side of the shaft main body portion 55. An inner ring raceway surface 11b is formed on an outer peripheral surface of the inner ring member 57.

The vehicular outer-side outer ring raceway surface 12a faces the shaft raceway surface 11a in a radial direction. The vehicular inner-side outer ring raceway surface 12b faces the inner ring raceway surface 11b in the radial direction. The balls that are the rolling elements 13 are arranged between the vehicular outer-side raceway surface and the vehicular inner-side raceway surface. The rolling elements 13 (balls) are provided in two rows. The rolling elements 13 in each row are held by the annular cages 14. A plurality of the rolling elements 13 is provided between the hub shaft 11 and the outer ring 12. Consequently, the outer ring 12 is provided radially outward of and concentrically with the hub shaft 11 (shaft main body portion 55).

The vehicular outer-side cage 14 holds the rolling elements 13 included in the rolling element row positioned on the vehicular outer side such that the rolling elements 13 are arranged at intervals in the circumferential direction. The vehicular inner-side cage 14 holds the rolling elements 13 included in the rolling element row positioned on the vehicular inner side such that the rolling elements 13 are arranged at intervals in the circumferential direction. The cage 14 is formed of, for example, resin.

The vehicular inner-side sealing apparatus 17 includes an annular seal member 40 and an annular slinger 50. The seal member 40 is fitted and attached to an inner peripheral and vehicular inner side of the outer ring 12 (outer ring main body 51). The slinger 50 is attached to an outer peripheral surface of the inner ring member 57 by being fitted to the outer peripheral surface by interference fitting. The seal member 40 (a lip of the seal member 40) is in sliding contact with the slinger 50. This allows suppression of ingress of foreign matter from a vehicular inner-side bearing exterior into a bearing interior. The bearing interior refers to an area between the hub shaft 11 and the outer ring 12 where the two rows of the rolling elements 13 are provided.

Figure 2:
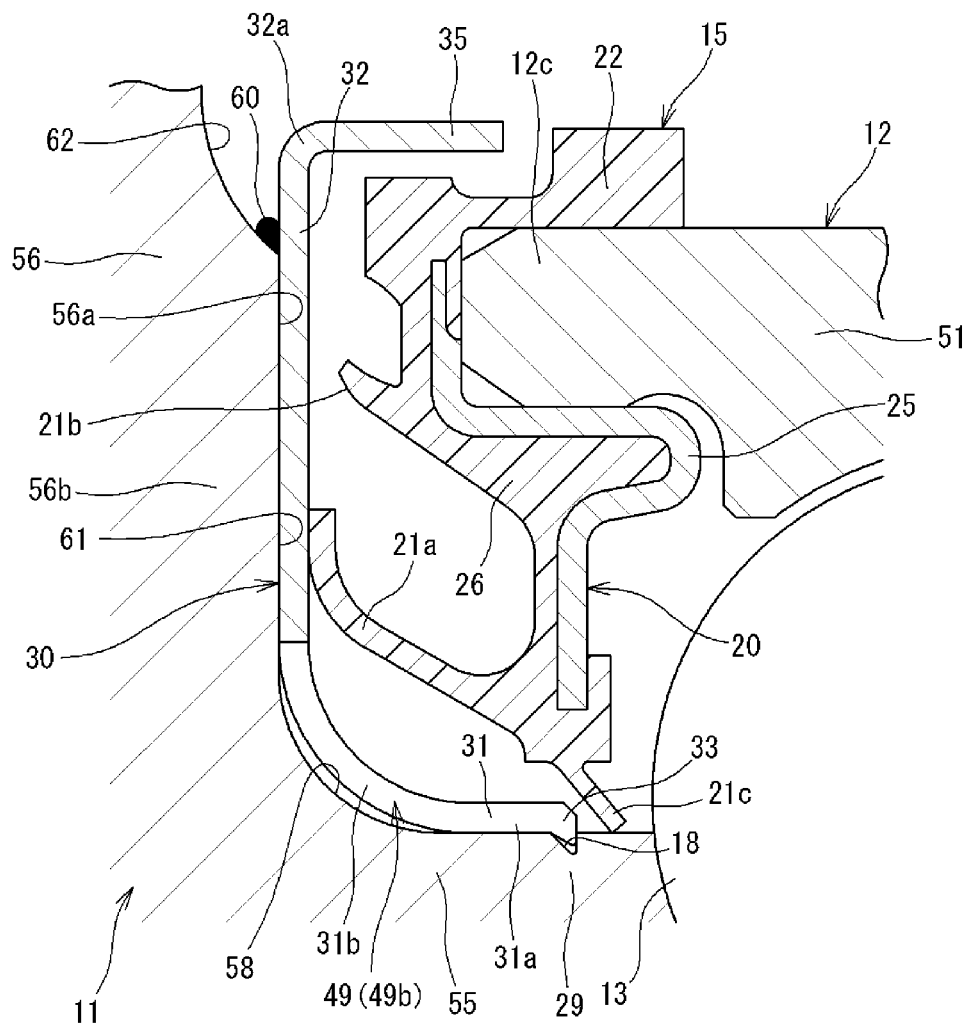
FIG. 2 is an enlarged sectional view depicting a sealing apparatus and a periphery thereof.

The vehicular outer-side sealing apparatus 15 includes an annular seal member 20 and an annular slinger 30. The seal member 20 is fitted and attached to an inner peripheral and vehicular outer side of the outer ring 12 (outer ring main body 51). FIG. 2 is an enlarged sectional view depicting the sealing apparatus 15 and a periphery thereof. The slinger 30 is attached to a vehicular outer side of the shaft main body portion 55. A lip 21a of the seal member 20 is in sliding contact with the slinger 30. This allows suppression of ingress of foreign matter from a vehicular outer-side bearing exterior into the bearing interior.

The seal member 20 has a core metal 25 formed of metal and a seal main body 26 formed of rubber. The core metal 25 is attached to an inner peripheral surface of a vehicular outer-side end 12c of the outer ring 12 (outer ring main body 51) by interference fitting. The seal main body 26 is fixed to the core metal 25 (vulcanized adhesion). The seal main body 26 has a first lip 21a, a second lip 21b, and a third lip 21c. The first lip 21a is in sliding contact with the slinger 30. The second lip 21b forms a clearance between the second lip 21b and the slinger 30. The third lip 21c is in sliding contact with the shaft main body portion 55. The first lip 21a has a function to prevent foreign matter such as muddy water from entering the bearing interior through the clearance between the first lip 21a and slinger 30. The second lip 21b has a function to restrain foreign matter such as muddy water from reaching an area where the first lip 21a and the slinger 30 are in sliding contact with each other. The third lip 21c has a function to mainly prevent grease in the bearing interior from flowing out. The first lip 21a contacts the slinger 30 in the axial direction. The third lip 21c contacts the shaft main body portion 55 in the radial direction.

The seal main body 26 depicted in FIG. 2 further has a fourth lip 22 that contacts an outer peripheral surface of the vehicular outer-side end 12c of the outer ring 12 (outer ring main body 51) so as to have an interference. The lip 22 has a function to prevent foreign matter such as muddy water from entering the bearing interior through the clearance between the outer ring 12 and the core metal 25.

The slinger 30 is an annular member formed of metal, in the present embodiment, stainless steel (SUS430). The slinger 30 has a circular ring portion 32 located on the vehicular outer side and a tube portion 31 extending from the circular ring portion 32 toward the vehicular inner side. The circular ring portion 32 is formed like a circular ring plate and is in contact with a side surface 56a (of a base portion 56b) of the flange 56 of the hub shaft 11 in the axial direction. The tube portion 31 is shaped like a tube.

A surface 58 is provided between the flange 56 and the shaft main body portion 55 and shaped to appear like a recessed curve in a section (see FIG. 2) including a center line C (hereinafter referred to as a bearing center line C) of the wheel bearing apparatus 10 (see FIG. 1). Thus, the tube portion 31 of the slinger 30 has a tapered tube portion 3 1b corresponding to the recessed curve. In other words, in FIG. 2 and FIG. 3, the tube portion 31 has a cylinder portion 31a located on the vehicular inner side and a tapered tube portion 31b that is located on the vehicular outer side and that is continuous with the cylinder portion 31a. The cylinder portion 31a is shaped to conform to a virtual cylindrical surface centered around the bearing center line C. The tapered tube portion 31b is shaped like a curve (is generally tapered) in section. Alternatively, the tapered tube portion 31b may be shaped so as to be folded along a circular arc.

The cylinder portion 31a of the tube portion 31 has pawl portions 33 on the vehicular inner side that is engaged with a part of an outer periphery of the hub shaft 11 (see FIG. 2). In the present embodiment, a recessed portion 18 is formed on an outer peripheral surface of a part (29) of the shaft main body portion 55 on the vehicular outer side so as to extend along the circumferential direction. The pawl portions 33 are engaged with the recessed portion 18. The pawl portions 33 protrude (are folded) radially inward.

The cylinder portion 31a of the tube portion 31 of the slinger 30 is externally fitted to the vehicular outer-side part (29) of the shaft main body portion 55 by interference fitting, and the pawl portions 33 are engaged with the recessed portion 18. The recessed portion 18 in the present embodiment is an annular recessed groove (a recessed groove that is continuous in the circumferential direction of the shaft main body portion 55). However, the recessed portion 18 may be recessed grooves formed partly (at intervals) along the circumferential direction of the shaft main body portion 55 depending on the positions of the pawl portions 33. A part of the hub shaft 11 (the above-described part of the outer peripheral surface of the shaft main body portion 55) to which the tube portion 31 of the slinger 30 is attached by external fitting is also referred to as an "attachment portion 29". The outer peripheral surface of the attachment portion 29 is a cylindrical surface centered around the bearing center line C.

Figure 3:
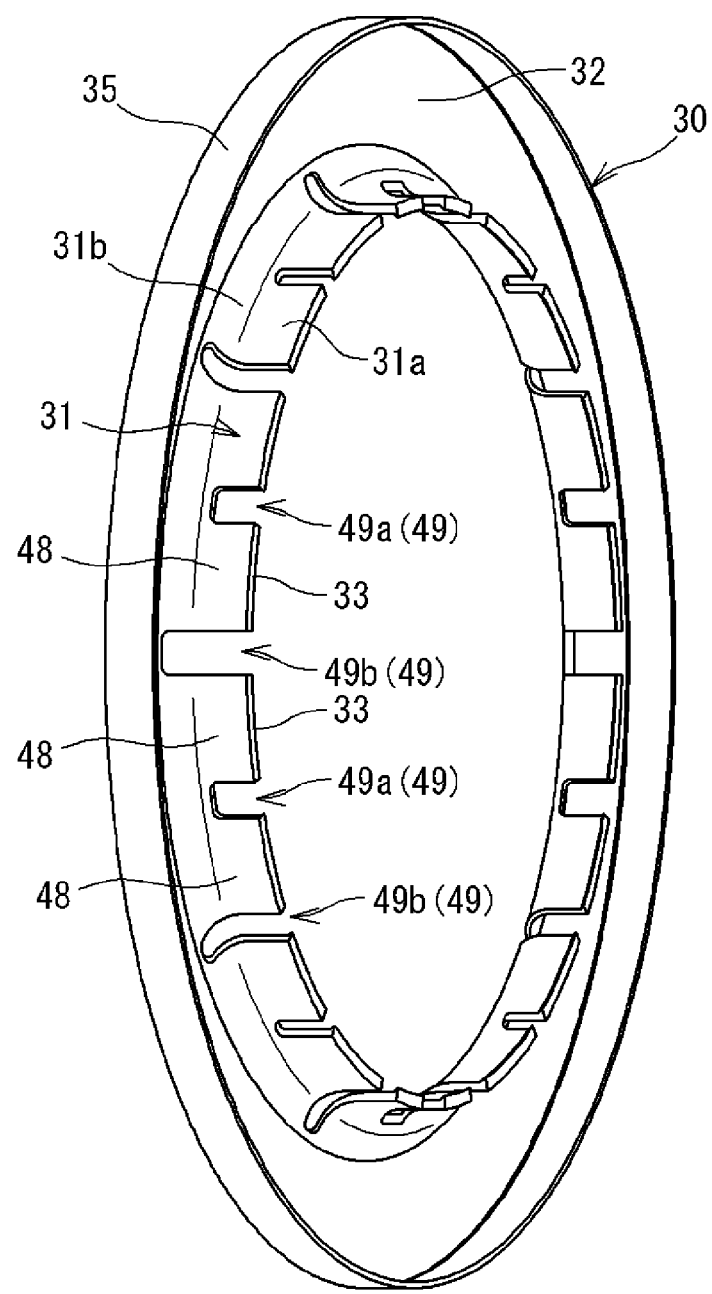
FIG. 3 is a perspective view of a slinger.

The circular ring portion 32 of the slinger 30 is in surface contact with the side surface 56a (of the base portion 56b) of the flange 56. With the circular ring portion 32 in contact with the flange 56, the slinger 30 is precluded from being displaced toward the vehicular outer side. The pawl portions 33 of the tube portion 31 are engaged with the part (recessed portion 18) of the outer periphery of the hub shaft 11 to inhibit the slinger 30 from being displaced toward the vehicular inner side. As depicted in FIG. 3, a plurality of the pawl portions 33 is provided along the circumferential direction. In other words, in the tube portion 31, a plurality of slits 49 is formed along the circumferential direction as described below. The slits 49, 49 lie adjacent to each other in the circumferential direction so as to form a spring piece portion 48 between the slits 49, 49. A tip of each spring piece portion 48 forms the pawl portion 33. Not all the spring piece portions 48 need to have the pawl portion 33, and the pawl portions 33 may be omitted from some discrete spring piece portions 48. However, the pawl portions 33 are preferably evenly arranged along the circumferential direction.

Figure 4:
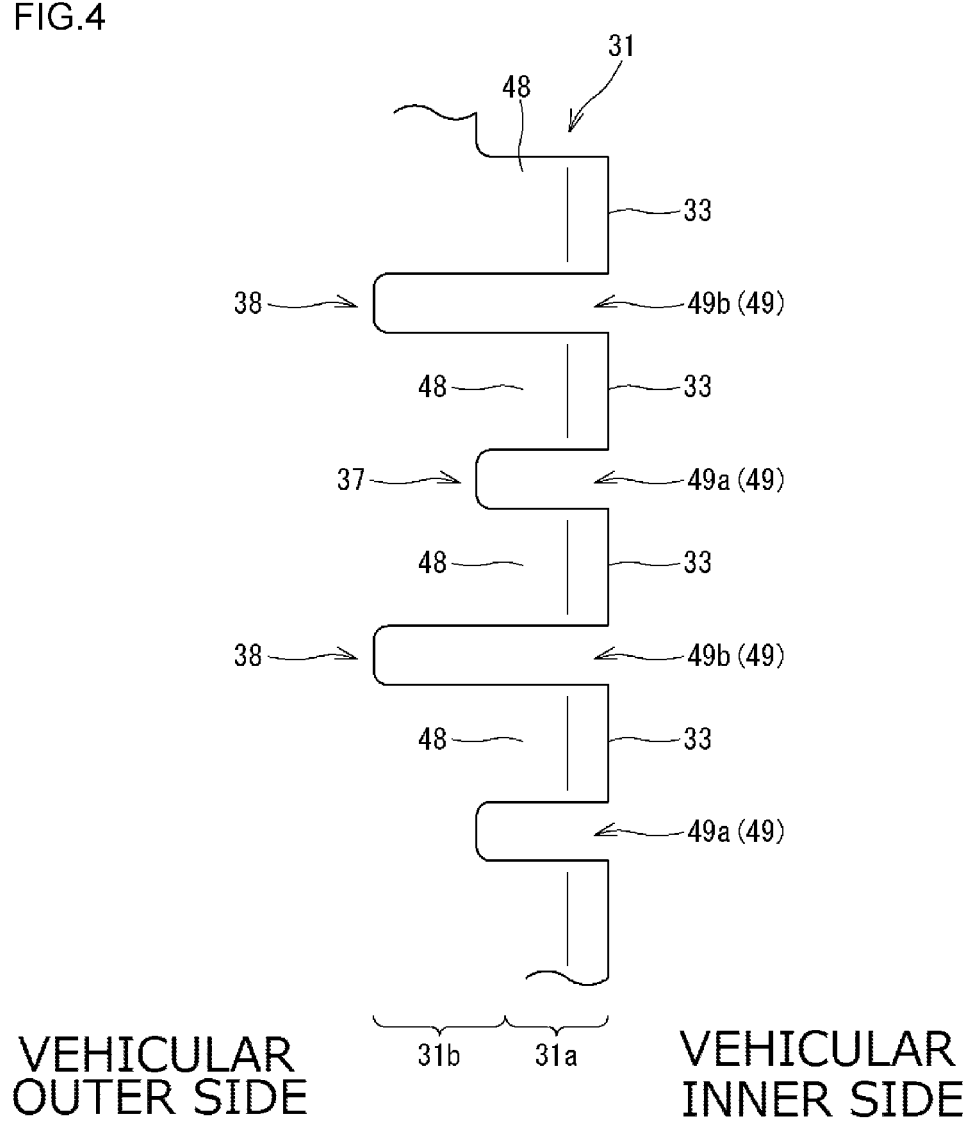
FIG. 4 is a diagram illustrating slits provided in the slinger.

The tube portion 31 has a plurality of the slits 49 formed along the circumferential direction so as to be open on the vehicular inner side. FIG. 4 is a diagram illustrating the slits 49. The diagram illustrates the tube portion 31 developed on a plane in order to facilitate description of the shape of the slits 49. As depicted in FIG. 3 and FIG. 4, the plurality of slits 49 includes slits with different depths (49a, 49b). In other words, axially shallow slits 49a and axially deep slits 49b are formed. The shallow slits 49a and the deep slits 49b are alternately formed along the circumferential direction of the tube portion 31.

The deep slits 49b are formed through the cylinder portion 31a to an area of the tapered tube portion 31b that is close to the circular ring portion 32. FIG. 2 depicts the deep slits 49b. The shallow slits 49a are formed through the cylinder portion 31a but only to an area of the tapered tube portion 31b that is close to the cylinder portion 31a. The shallow slits 49a may be formed exclusively in the cylinder portion 31a.

Figure 5:
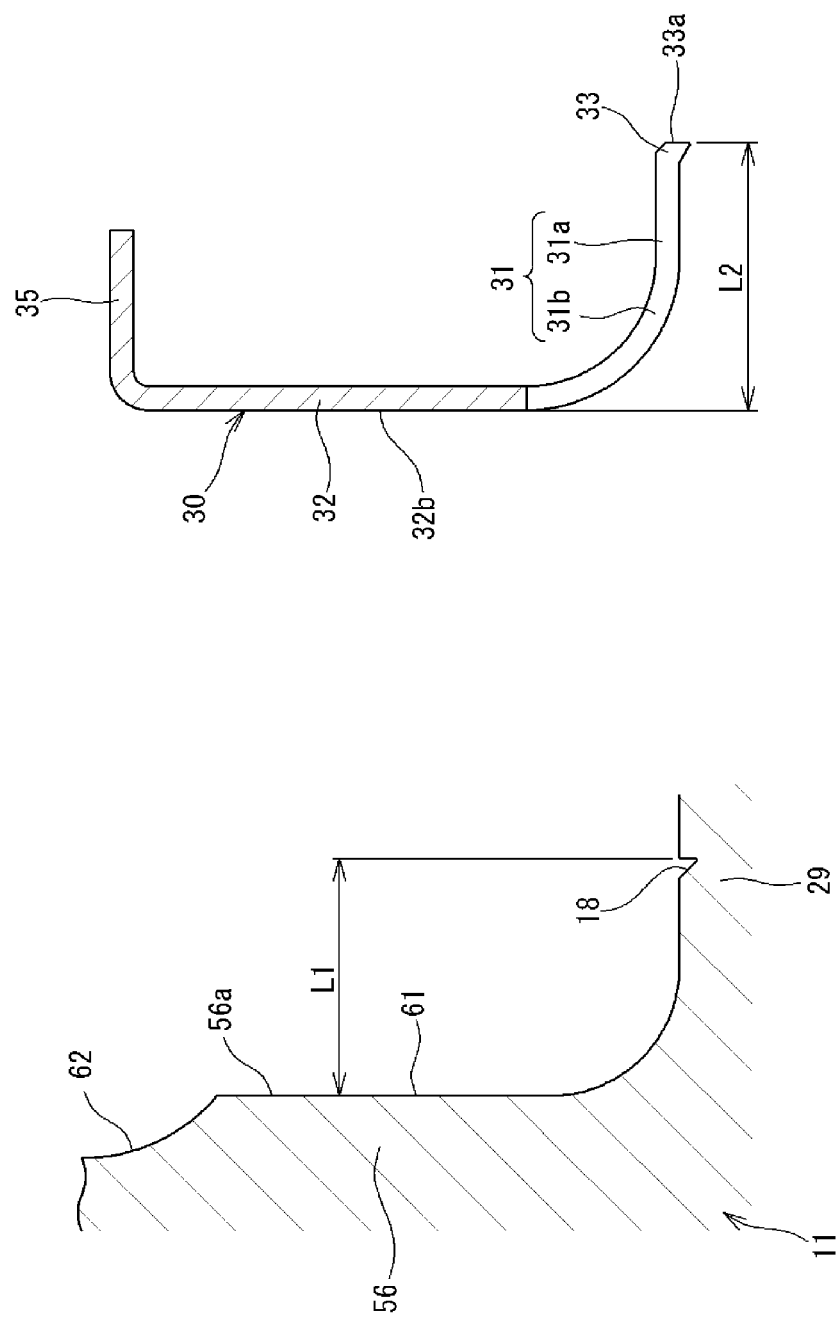
FIG. 5 is a diagram illustrating the slinger removed from a hub shaft.
Figure 6:
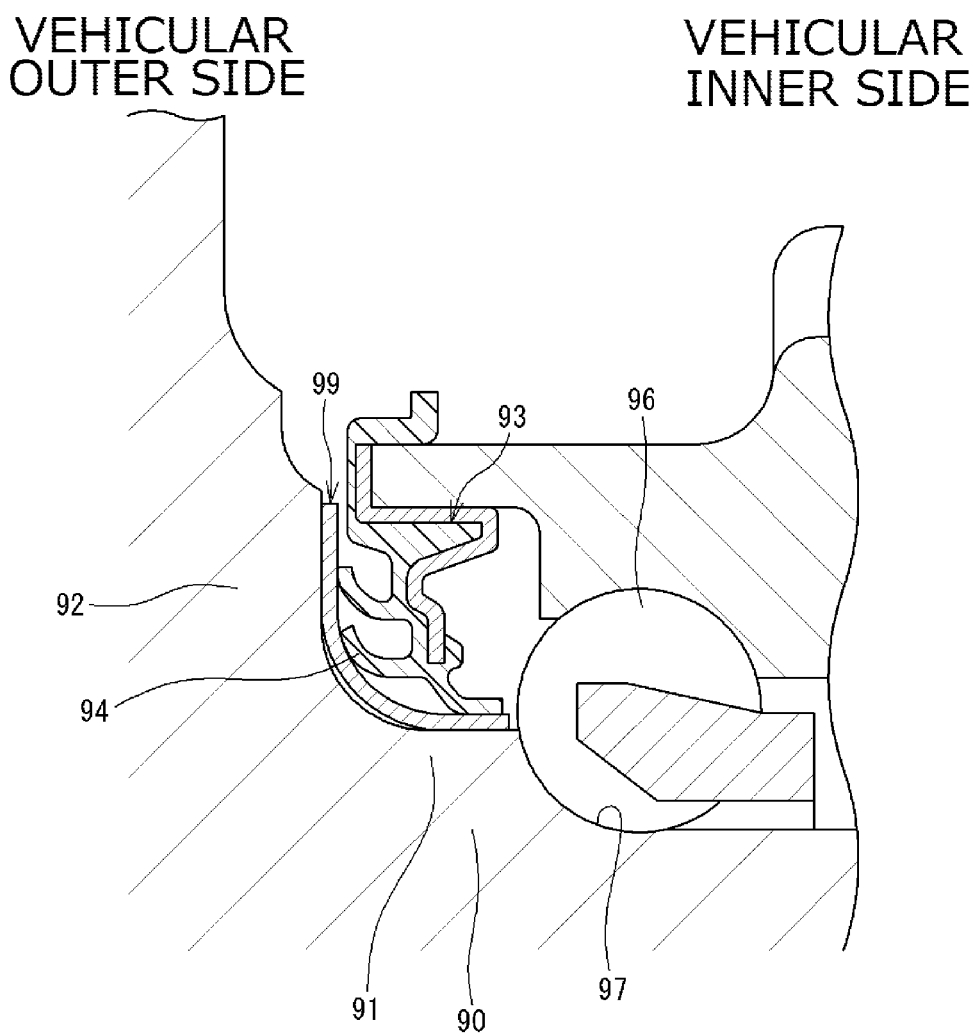
FIG. 6 is a sectional view depicting a conventional slinger and a periphery thereof.

FIG. 5 is a diagram illustrating the slinger 30 removed from the hub shaft 11 (before the slinger 30 is attached to the hub shaft 11). In this state, the slinger 30 is in a natural state. When the slinger 30 is attached to the hub shaft 11 (as depicted in FIG. 2), the slinger 30 is compressively elastically deformed in the axial direction. In other words, an axial dimension L1 between the flange 56 (radially inner surface portion 61) and the part (recessed portion 18) of the outer periphery of the hub shaft 11 with which the pawl portions 33 engage is smaller than an axial dimension L2 of the slinger 30 in the natural state before attachment as depicted in FIG. 5 (L1<L2). Thus, when attached to the hub shaft 11 depicted in FIG. 2, the slinger 30 is compressively elastically deformed in the axial direction. In other words, the circular ring portion 32 is pressed against the flange 56 in the axial direction (toward the vehicular outer side). The axial dimension L2 of the slinger 30 is a dimension from a vehicular outer-side surface 32b of the circular ring portion 32 to a tip 33a of the pawl portion 33 in the axial direction.

An annular water stop member is interposed between the circular ring portion 32 of the slinger 30 and the flange 56. The water stop member depicted in FIG. 2 is an O ring 60 formed of rubber. The side surface 56a of the flange 56 has the radially inner surface portion 61 with which the circular ring portion 32 is in surface contact and a radially outer surface portion 62 connected to the radially inner surface portion 61. The radially outer surface portion 62 is located on the vehicular outer side with respect to the radially inner surface portion 61. A part of the radially outer surface portion 62 that is connected to the radially inner surface portion 61 is shaped like a curved surface. The O ring 60 is interposed between the curved surface-shaped portion and the circular ring portion 32 of the slinger 30. The O ring 60 is in close contact both with the circular ring portion 32 and with the flange 56.

In the present embodiment depicted in FIG. 2, the slinger 30 has a second cylinder portion 35 extending from a radially outer end 32a of the circular ring portion 32 toward the vehicular inner side. The second cylinder portion 35 is positioned radially outward of a part of the fourth lip 22 of the seal member 20. A labyrinth clearance is formed between the second cylinder portion 35 and the fourth lip 22. The labyrinth clearance has a function to suppress external ingress of foreign matter such as muddy water into an area where the first lip 21a and the slinger 30 are in sliding contact with each other.

As described above, in the wheel bearing apparatus 10 in the present embodiment, the pawl portions 33 of the tube portion 31 of the slinger 30 engage with the recessed portion 18 formed in the outer periphery of the hub shaft 11 (see FIG. 2), and the circular ring portion 32 of the slinger 30 is in contact with the flange 56. This prevents the slinger 30 from moving in the axial direction from a predetermined attachment position (attachment position 29) on the hub shaft 11. This enables prevention of formation of a clearance between the slinger 30 and the flange 56 and prevention of ingress of foreign matter such as muddy water through the clearance between the slinger 30 and the flange 56. Prevention of movement of the slinger 30 keeps the interference of the lip 21a at a desired constant value. As described above, the vehicular outer-side sealing apparatus 15 allows high sealing performance to be achieved.

As described above (see FIG. 5), the axial dimension L1 between the flange 56 and the recessed portion 18 of the hub shaft 11 with which the pawl portions 33 engage is smaller than the axial dimension L2 of the slinger 30 in the natural state. Consequently, with the slinger 30 attached to the hub shaft 11, the slinger 30 (tube portion 31) is compressively elastically deformed in the axial direction. This allows the circular ring portion 32 to be pressed against the flange 56 in the axial direction. The O ring 60 is interposed between the circular ring portion 32 and the flange 56. Thus, with the circular ring portion 32 in contact with the flange 56 (with the circular ring portion 32 pressed against the flange 56), the slinger 30 can further be compressively elastically deformed with the O ring 60 sandwiched between the circular ring portion 32 and the flange 56. The O ring 60 has an interference (tightening force) to enhance the function to prevent foreign matter such as muddy water from entering the bearing interior through the clearance between the slinger 30 and the flange 56. The O ring 60 is provided in an area where the circular ring portion 32 exerts a relatively strong force on the flange 56.

As depicted in FIG. 4, the plurality of slits 49 formed in the tube portion 31 of the slinger 30 includes the slits 49a, 49b with the different depths. Consequently, the rigidity of the tube portion 31 may be varied depending on the position in the circumferential direction. A function of this configuration is to enhance an effect in which the circular ring portion 32 is pressed against the flange 56 in the axial direction, using portions 37 of the tube portion 31 that correspond to the shallow slits 49 and that have a higher rigidity. That is, when attached to the hub shaft 11, the slinger 30 is compressively elastically deformed in the axial direction. The portion of the slinger 30 that has a length in axial direction (in other words, the tube portion 31) has an increased rigidity to locally increase a repulsive force (restoring force) based on the compressive elastic deformation. The repulsive force appears as the force that presses the circular ring portion 32 against the flange 56. The repulsive force is locally increased using the portions 37 of the tube portion 31 that correspond to the shallow slits 49 and that have the higher rigidity. Consequently, the pressing force is increased to enhance the function to bring the slinger 30 and the flange 56 into close contact with each other to prevent formation of the clearance.

Another function provided by the variation of the rigidity of the tube portion 31 of the slinger 30 depending on the position in the circumferential direction will be described below. Attachment of the slinger 30 to the hub shaft 11 is facilitated using portions 38 of the tube portion 31 that correspond to the deep slits 49 and that have a lower rigidity. That is, when the slinger 30 is externally fitted to the hub shaft 11 to engage the pawl portions 33 with the recessed portion 18 (see FIG. 5 and FIG. 2), the spring piece portions 48 including the respective pawl portions 33 need to be deformed radially outward. Thus, compressive elastic deformation of the tube portion 31 (spring piece portions 48) is facilitated locally in the radial direction by the portions 38 of the tube portion 31 that correspond to the deep slits 49 and that have the lower rigidity. As a result, the slinger 30 can be easily attached. If the tube portion 31 as a whole has a high rigidity (for example, the tube portion 31 has no slits 49), the slinger 30 may be plastically deformed when the tube portion 31 is deformed radially outward so as to be attached to the hub shaft 11. In this case, the pawl portions 33 may fail to engage with the recessed portion 18 and slip off, leading to inappropriate attachment and a possibly weak pressing force. However, in the present embodiment, the slits 49 configured as described above (see FIG. 4) allow the tube portion 31 (spring piece portions 48) to be easily elastically deformed locally in the radial direction. Consequently, the slinger 30 can be prevented from being plastically deformed.

Moreover, the function to prevent foreign matter such as water from entering the bearing interior through the clearance between the slinger 30 and the flange 56 is preferably enhanced all along the circumference of the slinger 30. To achieve this, the portions 37 of the tube portion 31 having the higher rigidity may be evenly arranged in the tube portion 31 of the slinger 30 along the circumferential direction thereof. Thus, in the present embodiment, the shallow slits 49a and the deep slits 49b are alternately arranged along the circumferential direction of the tube portion 31. In this case, the portions 38 of the tube portion 31 having the lower rigidity are evenly arranged along the circumferential direction to further facilitate attachment of the slinger 30 to the hub shaft 11.

The embodiment disclosed above is illustrative in every way and is not restrictive. In other words, the wheel bearing apparatus in the invention is not limited to the illustrated embodiment but may be in any other form within the scope of the invention. For example, the slinger 30 depicted in FIG. 2 has the cylinder portion 35 on the radially outer side of the slinger 30, but the cylinder portion 35 may be omitted. The seal member 20 may have a shape different from the illustrated shape.

The invention keeps the slinger from moving from the predetermined position on the hub shaft to prevent foreign matter such as water from entering the bearing interior through the clearance between the slinger and the flange, thus enabling high sealing performance to be achieved.

What is claimed is:

1. A wheel bearing apparatus comprising:
    a hub shaft having a flange to which a wheel is attached and which is located on a vehicular outer side;
    an outer ring provided radially outward of the hub shaft;
    a plurality of rolling elements provided between the hub shaft and the outer ring;
    a cage that holds the rolling elements;
    an annular seal member attached to the outer ring; and
    an annular slinger which is externally fitted and attached to the hub shaft and with which the seal member is in sliding contact, wherein
    the slinger has a circular ring portion that is in contact with the flange and a tube portion extending from the circular ring portion toward a vehicular inner side, and the tube portion has a pawl portion located on the vehicular inner side to engage with a part of an outer periphery of the hub shaft to inhibit the slinger from being displaced toward the vehicular inner side, and
    the tube portion is further provided with a plurality of slits that is formed along a circumferential direction and that is open on the vehicular inner side, and the slits include slits with different depths.

2. The wheel bearing apparatus according to claim 1, wherein an annular water stop member is interposed between the cuircular ring portion and the flange.

3. The wheel bearing apparatus according to claim 2, wherein the slits that are shallow and the slits that are deep are alternately arranged along a circumferential direction of the tube portion. member is interposed between the circular ring portion and the flange.

4. The wheel bearing apparatus according to claim 3, wherein an axial dimension between the flange and a part of an outer periphery of the hub shaft with which the pawl portions engage is smaller than an axial dimension of the slinger in a natural state, and with the slinger attached to the hub shaft, the circular ring portion is pressed against the flange in an axial direction.

5. The wheel bearing apparatus according to claim 2, wherein an axial dimension between the flange and a part of an outer periphery of the hub shaft with which the pawl portions engage is smaller than an axial dimension of the slinger in a natural state, and with the slinger attached to the hub shaft, the circular ring portion is pressed against the flange in an axial direction.

6. The wheel bearing apparatus according to claim 1, wherein the slits that are shallow and the slits that are deep are alternately arranged along a circumferential direction of the tube portion.

7. The wheel bearing apparatus according to claim 6, wherein an axial dimension between the flange and a part of an outer periphery of the hub shaft with which the pawl portions engage is smaller than an axial dimension of the slinger in a natural state, and with the slinger attached to the hub shaft, the circular ring portion is pressed against the flange in an axial direction.

8. The wheel bearing apparatus according to claim 1, wherein an axial dimension between the flange and a part of an outer periphery of the hub shaft with which the pawl portions engage is smaller than an axial dimension of the slinger in a natural state, and with the slinger attached to the hub shaft, the circular ring portion is pressed against the flange in an axial direction.

* * * * *